Jan. 16, 1962  I. M. MEISSLER ET AL  3,016,771
PROCEDURE AND TOOL FOR THE MANUFACTURE OF
VARIOUS KINDS OF FILES AND RASPS
Filed Feb. 6, 1958
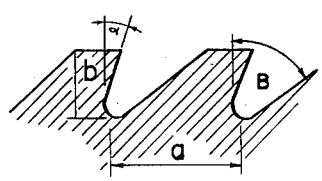
FIG. 1
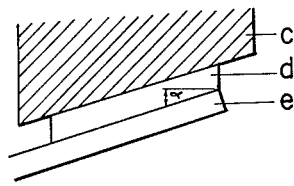
FIG. 2
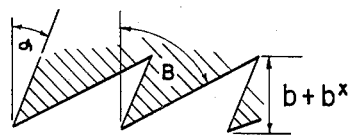
FIG. 3a
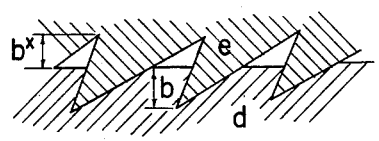
FIG. 3b
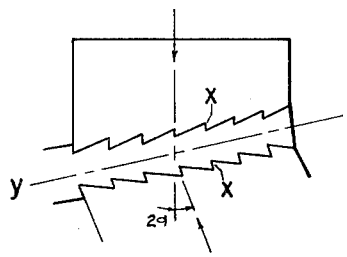
FIG. 4
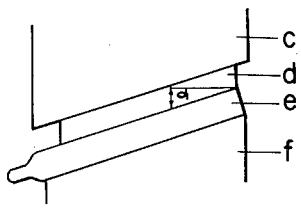
FIG. 5
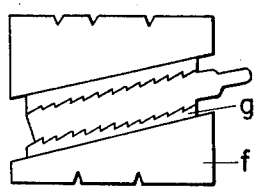
FIG. 6a
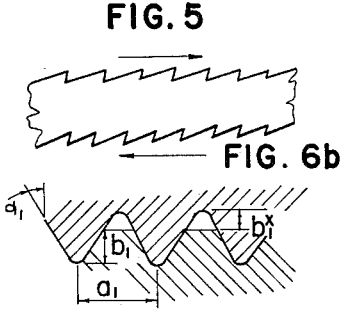
FIG. 6b
FIG. 7
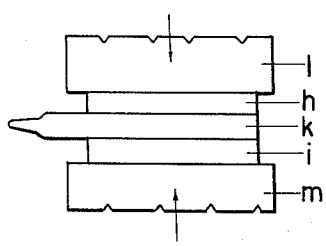
FIG. 8
INVENTORS
IVAN M. MEISSLER
LASZLO FAZEKAS
BY
Lamont Johnston
ATTORNEY

United States Patent Office 3,016,771
Patented Jan. 16, 1962

3,016,771
PROCEDURE AND TOOL FOR THE MANUFACTURE OF VARIOUS KINDS OF FILES AND RASPS
Ivan M. Meissler, Chattanooga, Tenn. (990 Anderson Ave., Bronx, N.Y.), and Laszlo Fazekas, 159 Grace St., Toronto, Ontario, Canada
Filed Feb. 6, 1958, Ser. No. 713,596
2 Claims. (Cl. 76—13)

For several decades now nothing new has been developed in the art of manufacturing files and rasps. This statement holds true especially for the industrial production of rasps, which is done up till this very day like this that one takes a correspondingly shaped, pointed chisel, and imparts the dentation to the material which shall be shaped into a rasp, by hand, and one must pay great attention to knock the teeth in the correct distance(s) from each other when doing this. Files one produces by aid of machines. The machine which knocks the dentations into the bar which shall be shaped into a file, is provided with a chuck which supports a very sharp chisel, and the chisel with its complete support is pressed into the bar, which lies on a table, by aid of a spring which has a certain tension. An excenter lifts the toolholder together with the cutting chisel, and as soon as said excenter or cam lets the tool-holder go, the chisel will be pressed by aid of the spring unto the bar, and a cutting edge is formed. The supporting table or base has an automatic feed or advance, at any lifting of the tool the bar will be moved forward one gash (distance between two teeth), and when then the chisel drops down again, a tooth is formed in the correct distance from the prior one. The table is inclined, so that one really can undercut each tooth correctly. Several teeth can be produced in parallel (or series of teeth) by aid of a certain adjustment of the chisel. If a file shall be equipped with several rows of teeth, all which rows point in different directions, the bar must be passed then through the machine a corresponding number of times.

These procedures described are slow, cumbersome and are not at all suited to the exigencies of modern times. In order to overcome these disadvantages, the rasps and files are manufactured according to the present invention by aid of a press process, like this that simultaneously more than one tooth is impressed into the rod, bar or other material which shall be transformed into a file or rasp. In order to do so one chucks the press tool into a press, which is known per se to prior art. It is preferred to construct the tool like this that all teeth which point in the same direction, are pressed on one side simultaneously. The process is rapid, more accurate than the older one, and does not make so much noise. According to this method any kind of file or rasp can be produced, only the matrices (punches) used for pressing are different always, in full agreement with the teeth of the rasps or files to be produced.

We shall explain the invention in greater detail under reference to the attached sheet of drawings. The sheet of drawings shows a typical example of the present invention. We show there how an industrial file is produced. In FIGURE 1 one sees the teeth of the file, and part of the tips of the cutting device which does the main cutting job. In FIGURE 2 one sees the file part which has already gotten its teeth, together with the total pressing device (stamping device, cutter), and the individual steps are drawn there too. The FIGURES 3a and 3b show the teeth of the punch individually and at the moment, where they are pressed into the bar which is to become the file. FIGURES 4 and 5 show two possibilities how the file teeth can be produced.

According to the method used in FIGURE 4 the profiled cuter is shaped to show an apical angle of $2\alpha$, it is pushed forward under hydraulic pressure, and with such cutters one produces a dentation of equal direction on both sides. The tool shown in FIGURE 5 has a pressure which always acts in the same direction, it used to place all the teeth desired on one side, simultaneously.

The tool shown in FIGURE 6 is used, for the case of a unilateral pressure, to press the teeth from two sides. In FIGURE 7 are shown the shape of the teeth of the punches needed. FIGURE 8 shows an assembly of all the parts and tools required to press one file.

At the files used in the iron industry which show two rows of teeth, the corresponding cutting edges or tips are not equivalent to each other. In one direction runs the main cutting tip, in the other one the additional cutting tip. The main cutting tip is the regular shearing tip or tooth of a chucking device, the other tip or tooth breaks the action of the main tooth, acts upon it so as to make it appear harder, and this way the filing action becomes more pronounced. The tooth profile of the main cutting tip is the one shown in FIGURE 1, where $\alpha$ is the angle at the bottom side of the tooth (undercutting), and $\beta$ is the angle at the back of the tooth. The distance between two teeth is $a$, and $b$ is the height of a tooth.

Based upon these statements one may see that the principle of the construction of the main-cutting, tips-producing tool has to be: the main tips or teeth have to be produced in a way that undercutting is possible, so that the part to be transferred into a file has to be clamped into the machine tool under an angle, and in this case the angle $\alpha$ must agree with the angle of undercutting, i.e. it is the same $\alpha$. $c$ is the upper part of the tool, $d$ is the punch for the teeth, $e$ is the material to be transformed into a file, $\alpha$ is the angle of the undercutting. FIGURE 3a shows the punch separately in true-to-scale dimensions. The undercutting of the file tooth corresponds to its angle $\alpha$, $\beta$ is the angle at the back of the tooth, $a$ is the distance from tooth to tooth, $b$ is the height of the teeth, $b^x$ is a certain distance (see drawing), chosen like this that preferably $b$ is greater than $b^x$, which serves the purpose to allow the free flow of the file material. FIGURE 3b shows the deepest position of the punch during the operation (inside the file material), here $e$ is the punch, and $d$ the material which is to be made into a file.

The tool shown in FIGURE 4 serves to produce the teeth on both sides of the file simultaneously, and it is shaped like this that the shorter side $x$ of its teeth, which look like saw teeth, are parallel to the direction of motion of the tool halves, and the vertical forms the angle $\alpha$ with the longitudinal direction of the file (Y). This now means that the two pressing or stamping devices which act opposite each other, have the same direction of motion, the two $x$ then also have the same direction, thus they will enclose the angle $2\alpha$. If we expect to prepare file teeth which exert their pressures in the same direction, then we may use the tool shown in FIGURE 5. Depending upon the course of the tooth, one chooses the $\alpha$ for the punch $d$ of the tool $c$. In the lower half $f$ of the tool no punch is provided for, there one finds only a copper bearing (die) upon which the file material $e$ is placed. The lower part of the tool here serves the purpose to transfer the force exerted by the upper part of the machine and to prevent that the file slides out, and that teeth which have already been cut, are ruined. This is also the construction we use when we wish to prepare rasps on an industrial scale.

If we wish to prepare files where the direction of the filing action is opposite at the two sides of the file (think e.g. of fingernail files), we will use e.g. the device shown in FIGURE 6a. Here into the tool half $f$ a punch $g$ is clamped, which serves under application of pressure in one direction only, to prepare simultaneously the teeth on both sides of the file. The parts (stamps) producing the teeth need not undercut, as the teeth of such files are never used to exert highest pressures, therefore the punch has the shape shown in FIGURE 7. Here $b^x1$ again is air space just as we described it above at the production of the main working teeth of a file, $b1$ is the height of a tooth of the file $a1$, and $\alpha$ is the angle of undercutting.

In order to do the pressing action upon the punches discussed thus far one uses the device shown in FIGURE 8. Here the file (part to be made into a file) $k$ is placed vertical to the direction of pressure, into the device between the upper punch $h$ and the lower punch $i$. $l$ is the upper half of the tool, $m$ its lower half.

It is not possible to render exact statements about the magnitude of the pressure, because each file is made of a different material, the tips (teeth) are of various numbers and/or lengths, at rasps the teeth are of different sizes and numbers, in short, always another amount of force will be needed. The action exerted upon the material to be shaped into a file must be great enough to surpass the flow limit of such material, because only then the desired imparting of the shape of the teeth can occur.

We claim:

1. A method for producing files and rasps out of a blank having parallel opposite surfaces, by stamping in order to form undercut teeth on both surfaces of the said blank, in which two stamping tools, each of which having a multitude of undercut teeth, are moved against the opposite surfaces of the blank in directions parallel to the flanks of the undercut teeth of the stamping tools and deviating from the vertical on the opposite surfaces of the blank for an angle equal to the angle of back taper of the teeth, the said directions of movement of the said tools crossing each other under an angle equal to twice the angle of back taper of the teeth of the tools, thereby forming a multitude of teeth at the same time on each of the opposite surfaces of the blank.

2. In a device for producing files and rasps out of a blank having parallel opposite surfaces, by stamping in order to form undercut teeth on both surfaces of the said blank, two press rams, a tool connected to each of the said press rams, a multitude of teeth on each of the said tools, the said last-named teeth having edges and undercut flanks, and means for moving each of the said press stamps together with the said tools toward each other, the direction of movement of each of the said tools being parallel to the flanks and perpendicular to the edges of the teeth of the said tools, the moving directions of said press rams and tools crossing each other under an angle corresponding to twice the angle of back taper of the said teeth.

References Cited in the file of this patent

UNITED STATES PATENTS

| | | |
|---|---|---|
| 371,778 | McDougall | Oct. 18, 1887 |
| 408,936 | Stokes | Aug. 13, 1889 |
| 1,433,306 | Slater | Oct. 24, 1922 |
| 1,776,711 | Unger | Sept. 23, 1930 |
| 1,896,199 | Peiseler | Feb. 7, 1933 |
| 2,255,269 | Perrine | Sept. 9, 1941 |

FOREIGN PATENTS

| | | |
|---|---|---|
| 101,849 | Great Britain | Oct. 26, 1916 |